US011352914B2

(12) United States Patent
Wagner et al.

(10) Patent No.: US 11,352,914 B2
(45) Date of Patent: Jun. 7, 2022

(54) VALVE TRAIN FOR AN INTERNAL COMBUSTION ENGINE OF A MOTOR VEHICLE, AND METHOD FOR OPERATING SUCH A VALVE TRAIN

(71) Applicant: Daimler AG, Stuttgart (DE)

(72) Inventors: Marc Oliver Wagner, Esslingen am Neckar (DE); Josef Astner, Kernen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 17/286,010

(22) PCT Filed: Oct. 15, 2019

(86) PCT No.: PCT/EP2019/078015
§ 371 (c)(1),
(2) Date: Apr. 16, 2021

(87) PCT Pub. No.: WO2020/079030
PCT Pub. Date: Apr. 23, 2020

(65) Prior Publication Data
US 2021/0381400 A1 Dec. 9, 2021

(30) Foreign Application Priority Data
Oct. 18, 2018 (DE) ...................... 10 2018 008 235.1

(51) Int. Cl.
*F01L 1/18* (2006.01)
*F01L 13/06* (2006.01)
*F01L 1/46* (2006.01)

(52) U.S. Cl.
CPC .............. *F01L 1/181* (2013.01); *F01L 13/06* (2013.01); *F01L 1/46* (2013.01)

(58) Field of Classification Search
CPC .............. F01L 1/181; F01L 1/46; F01L 13/06
(Continued)

(56) References Cited

U.S. PATENT DOCUMENTS

2005/0188966 A1* 9/2005 Ruggiero .................. F01L 1/20
123/568.14

FOREIGN PATENT DOCUMENTS

| DE | 10 2008 050 171 A1 | 4/2010 |
| EP | 1 156 193 A1 | 11/2001 |
| EP | 2 598 727 B1 | 6/2013 |

OTHER PUBLICATIONS

PCT/EP2019/078015, International Search Report dated Feb. 5, 2020 (Two (2) pages).
(Continued)

*Primary Examiner* — Jorge L Leon, Jr.
(74) *Attorney, Agent, or Firm* — Crowell & Moring LLP

(57) ABSTRACT

A valve train of an internal combustion engine of a motor vehicle includes a rocker arm assigned to a first combustion chamber of the internal combustion engine where via the rocker arm a gas exchange valve assigned to the first combustion chamber is actuatable. An actuating device is assigned to a second combustion chamber of the internal combustion engine where via the actuating device, by supplying the actuating device with a hydraulic fluid, the second combustion chamber is switchable between a firing mode for fired operation and a braking mode for an engine braking operation of the internal combustion engine. A supply of the hydraulic fluid to the actuating device assigned to the second combustion chamber is adjustable by the rocker arm assigned to the first combustion chamber.

7 Claims, 3 Drawing Sheets

(58) Field of Classification Search
USPC .......................................... 123/90.39, 90.44
See application file for complete search history.

(56) References Cited

OTHER PUBLICATIONS

German-language German Office Action issued in German application No. 10 2018 008 235.1 dated Jun. 25, 2019 (Seven (7) pages).

\* cited by examiner

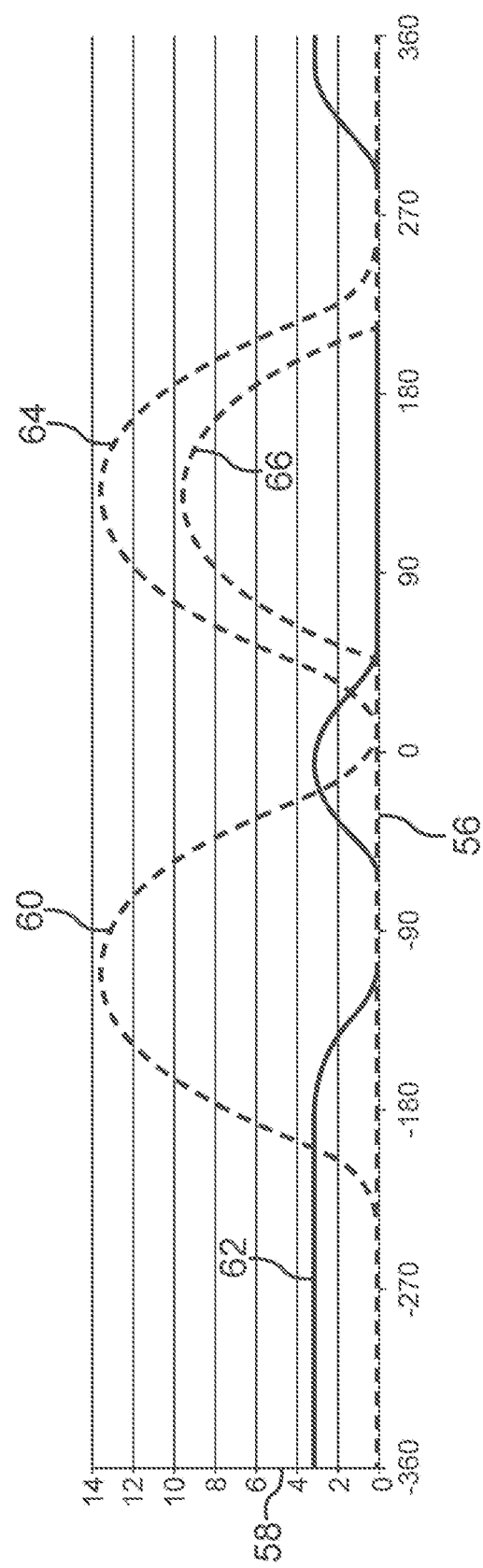

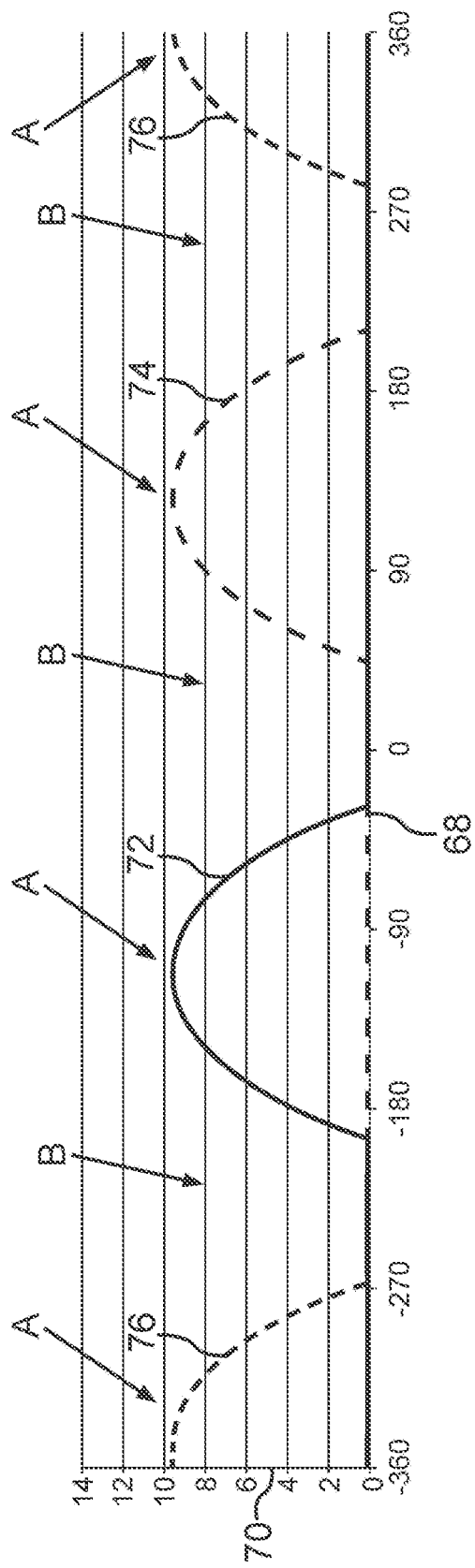

VALVE TRAIN FOR AN INTERNAL COMBUSTION ENGINE OF A MOTOR VEHICLE, AND METHOD FOR OPERATING SUCH A VALVE TRAIN

BACKGROUND AND SUMMARY OF THE INVENTION

The invention relates to a valve train for an internal combustion engine of a motor vehicle, in particular an automobile, as well as a method for operating such a valve train.

Such valve trains and methods for operating such valve trains for internal combustion engines of motor vehicles, in particular automobiles, are already sufficiently known from the general prior art and in particular from series vehicle construction. The valve train has at least one rocker arm which is assigned to a first combustion chamber of the internal combustion engine. At least one gas exchange valve assigned to the first combustion chamber can be actuated via the rocker arm. The valve train also has an actuating device which is assigned to a second combustion chamber of the internal combustion engine, which is different from the first combustion chamber and is provided in addition to the first combustion chamber. By way of example, the internal combustion engine is designed as a reciprocating piston engine or as a reciprocating piston internal combustion engine, such that the combustion chambers are designed as cylinders. The actuating device is designed as a hydraulic actuating device, i.e., as an actuating device that can be hydraulically actuated or operated, by means of which, by supplying the actuating device with hydraulic fluid, the second combustion chamber can be switched between a firing mode for fired operation and a braking mode for an engine braking operation of the internal combustion engine. In other words, to adjust the fired operation of the internal combustion engine, the fired operation of the second combustion chamber is adjusted. The fired operation is, for example, a so-called normal operation, wherein during the fired operation, combustion processes take place at least in the second combustion chamber, in particular in the combustion chambers, in the course of which respective fuel-air mixtures are combusted. This results in exhaust gas, which is pushed out of the respective combustion chamber by means of a piston, for example. This exhaust gas comprises combustion products resulting from the respective combustion of the respective fuel-air mixture.

However, in order to set the engine braking mode and thus an engine brake which is or can be implemented by the internal combustion engine, the braking mode of the second combustion chamber is set such that at least the second combustion chamber is operated in the braking mode. During the engine braking operation, combustion processes are omitted at least in the second combustion chamber, in particular in the combustion chambers, such that no combustion processes take place at least in the second combustion chamber during the engine braking operation or during the braking operation. In this case, the exhaust gas during engine braking operation does not comprise any combustion products but rather, for example, at least or exclusively air. The braking mode and the firing mode of the second combustion chamber differ in particular with regard to the actuation of the gas exchange valve. In particular, the gas exchange valve is actuated with different opening and closing times and valve strokes in each case in the braking mode and firing mode.

Such engine braking operations or engine brakes and their respective functions are sufficiently known from general prior art. By way of example, the gas exchange valve is actuated during the braking operation in such a way that a decompression brake is implemented, such that the aforementioned engine brake is designed as an engine decompression brake. As is sufficiently known, in the context of such a decompression brake, gas compressed in the combustion chamber by means of the aforementioned piston is released unused from the combustion chamber by actuating, in particular opening, the gas exchange valve accordingly by means of the associated rocker arm. Unused discharging means that compression energy contained in the compressed gas is not used to move the piston from its top dead center to its bottom dead center. Thus, the internal combustion engine must perform compression work to compress the gas in the combustion chamber, wherein this compression work—since the compressed gas is discharged unused from the combustion chamber—is not used to move the piston from its top dead center to its bottom dead center. As a result, the internal combustion engine, in particular an output shaft of the internal combustion engine designed for example, as a crankshaft, is braked, as a result of which, for example, wheels of the motor vehicle as a whole are braked. The gas exchange valve is designed in particular as an exhaust valve. Such a valve train is used in particular in commercial vehicles, in particular in commercial automobiles. Furthermore, EP 2 598 727 B1 discloses a valve train for actuating at least one gas exchange valve of an internal combustion engine.

Furthermore, from DE 10 2008 050 171 A1, a valve train device, in particular for an internal combustion engine, is known, having at least one first valve actuation unit, which has a hydraulic actuator unit, and having at least one second valve actuation unit, which has a switching unit for controlling at least a part of the actuator unit of the first valve actuation unit.

The object of the present invention is to further develop a valve train and a method of the type mentioned above in such a way that a particularly advantageous operation can be implemented.

In order to further develop a valve train of the type specified herein in such a way that a particularly advantageous valve train can be implemented, it is provided in accordance with the invention that the supply of hydraulic fluid to the actuating device assigned to the second combustion chamber can be adjusted by means of the rocker arm assigned to the first combustion chamber. In other words, the rocker arm, which is not assigned to the second combustion chamber but to the first combustion chamber, is used as a control or valve element to adjust, i.e., influence, the supply of hydraulic fluid to the actuating device, which is not assigned to the first combustion chamber but to the second combustion chamber. This makes it possible to avoid unfavorable times at which, for example, the second combustion chamber is switched from firing mode to braking mode or the internal combustion engine as a whole is switched from the fired mode to the engine braking mode or from the engine braking mode to the fired mode, such that excessive loads acting on the valve train can be avoided. In other words, with the valve train according to the invention, it is possible, in a simple, weight-saving and cost-effective manner, to avoid unfavorable situations or times at which the engine braking mode is activated or deactivated, thus avoiding excessive loads on the valve train.

Since the second combustion chamber can be switched between the firing mode and the braking mode by means of the actuating device by supplying the actuating device with the hydraulic fluid, i.e., by actuating or operating it, the actuating device is designed as a hydraulically operable actuating device, i.e., as a hydraulic actuating device. Thus, the engine braking operation for the fired operation is activated or deactivated hydraulically, such that an engine braking of the internal combustion engine which can be implemented by the braking operation or the engine braking operation is designed as a hydraulic engine brake, i.e., as a hydraulic engine braking system.

The invention is based in particular on the knowledge that today's conventional hydraulic engine braking systems, in particular of internal combustion engines in commercial vehicles, are achieved or implemented by applying hydraulic pressure. This hydraulic pressure is provided by the hydraulic fluid in the form of oil, for example. The pressure or the hydraulic fluid is released by a valve device designed for example, as an electric switching valve, wherein this valve device can be, for example, a valve device different from the rocker arm and provided in addition thereto.

Several actuating devices, also referred to as hydraulic units, are usually provided, wherein the actuating devices are assigned to different combustion chambers. By releasing the hydraulic pressure, the hydraulic units are supplied with the hydraulic fluid or the hydraulic units are filled at least substantially simultaneously. The hydraulic units have, for example, respective hydraulic actuating pistons which are extended to activate the engine brake. This extension of the hydraulic actuating pistons is caused by supplying or filling the hydraulic units with hydraulic fluid. Due to the fact that the hydraulic units are supplied with the hydraulic fluid at least substantially simultaneously and are thus filled with the hydraulic fluid at least substantially simultaneously, or due to the fact that the supply of the hydraulic units with the hydraulic fluid is started at least substantially simultaneously and due to, for example, production-related tolerance positions of components of the hydraulic units, the hydraulic actuating pistons are set in motion at different positions in relation to the respective top ignition dead center (TDC) of the respective associated combustion chamber, which is designed, for example, as a cylinder. As a result, situations can occur in which the actuating pistons are not fully extended at the start of the valve lift required for engine braking operation, such that the necessary valve lift for engine braking operation is not achieved at the start of engine braking operation, which can lead to particularly high combustion chamber pressures, in particular cylinder pressures, and thus to high loads acting on the valve train. This is all the more relevant because future systems will no longer require only the extension of one hydraulic actuating piston per combustion chamber, in particular cylinder, but may additionally provide the hydraulic shutdown of a further component or possibly even a corresponding process not only on an exhaust side, but also on an intake side of the internal combustion engine.

Against this background, it is desirable that each combustion chamber of the internal combustion engine can be specifically transferred to braking mode in a specific or predeterminable crank angle window, in particular of its own crank circuit, whereby excessively high transient loads acting on the valve train can be avoided when switching between firing mode and braking mode. This can now be implemented by means of the valve train according to the invention in a particularly simple, cost- and weight-efficient manner.

The invention is further based on the knowledge that it is usually provided to take the hydraulic fluid for actuating the respective actuating device at least substantially directly from a channel and to supply it to the plurality of actuating devices. However, this can result in the above-mentioned different positions of the actuating pistons. This can now be avoided, since it is provided in accordance with the invention that the actuating device assigned to the second combustion chamber is supplied with the hydraulic fluid via the rocker arm assigned to the first combustion chamber. Thus, for example, the hydraulic fluid, which is in the form of oil in particular, is initially fed to the rocker arm, which is not assigned to the second combustion chamber, whose actuating device is to be supplied with hydraulic fluid, but rather to the first combustion chamber. In other words, the rocker arm, by means of which the supply of hydraulic fluid to the actuating device can be adjusted, is not assigned to the same combustion chamber as the actuating device to be supplied with hydraulic fluid, but rather the actuating device to be supplied with hydraulic fluid and the rocker arm are assigned to different combustion chambers, in particular cylinders. In this way, a particularly advantageous and, in particular, low-load operation of the valve train can be implemented.

In an advantageous embodiment of the invention, the rocker arm is pivotably arranged on a rocker arm axis such that the rocker arm can be pivoted relative to the rocker arm axis. The rocker arm axis has at least two conducting elements through which the hydraulic fluid can flow and via which the hydraulic fluid provided by a source can be guided to the actuating device. Here, the rocker arm can be pivoted relative to the rocker arm axis between at least one first pivot position interrupting a fluid connection between the conducting elements and at least one second pivot position releasing the fluidic connection between the conducting elements. This means that the conducting elements are fluidically separated from each other in the first pivot position of the rocker arm by means of the rocker arm, such that the hydraulic fluid cannot flow from one of the first conducting elements into the second conducting element, for example. With respect to a flow direction of the hydraulic fluid through the conducting elements, the first conducting element is arranged upstream of the second conducting element, for example, wherein the second conducting element is arranged upstream of the actuating device and thus between the actuating device and the first conducting element. Thus, in the first pivot position of the rocker arm, the hydraulic fluid cannot flow to the actuating device, such that the actuating device cannot be supplied with hydraulic fluid.

In the second pivot position, however, the rocker arm releases the fluidic connection between the conducting elements, such that the hydraulic fluid can flow from the first conducting element into the second conducting element and flow through the second conducting element. The hydraulic fluid can then be guided or flow from the second conducting element to the actuating device, whereby the actuating device is supplied with the hydraulic fluid.

It has been shown to be particularly advantageous if the rocker arm interrupts the fluidic connection between the conducting elements in a first pivot range of the rocker arm comprising a plurality of first pivot positions of the rocker arm, and releases the fluidic connection between the conducting elements in a second pivot range of the rocker arm comprising a plurality of second pivot positions different from the first pivot positions and different from the first pivot range. This makes it possible to create a particularly advantageous range, in particular a crank angle range, in which the actuating device can be supplied with the hydraulic fluid in order, for example, to switch the second combustion chamber from the firing mode to the braking mode or vice versa.

A further embodiment is characterised in that the rocker arm is assigned at least one cam, which has a base circle region, in which actuation of the rocker arm caused by the cam does not occur, and at least one elevation region, which is raised relative to the base circle region, for actuating the rocker arm, wherein at least in the base circle region, the release of the fluidic connection between the conducting elements does not occur. In other words, if the rocker arm is in the base circle region and thus on the base circle of the cam, the hydraulic fluid is blocked from further flow, in particular from the first conducting element into the second conducting element and in particular further towards the actuation device, by means of the rocker arm. The base circle region is assigned to the first swivel positions.

Here, it is preferably provided that the rocker arm releases the fluidic connection at least in a part of the elevation region. If, for example, the rocker arm thus executes its pivoting movement, in particular its second pivoting positions, wherein the pivot movement of the rocker arm is effected by means of the cam and, in particular, by means of at least part of the elevation region, the rocker arm releases the second conducting element, which is designed, for example, as an oil channel, to the actuating device, which is also referred to as the engine braking unit, such that the actuating device can be filled with the hydraulic fluid.

It has proved particularly advantageous if an ignition sequence is provided according to or in which respective ignition processes for igniting respective fuel-air mixtures in the combustion chambers take place one after the other, wherein the second combustion chamber follows the first combustion chamber in relation to this ignition sequence. This means that, during fired operation of the internal combustion engine, the second combustion chamber is ignited chronologically after the first combustion chamber, or the ignition process in the first combustion chamber takes place chronologically before the ignition process in the second combustion chamber. It has been found that this makes it particularly easy to adapt the supply of hydraulic fluid to the actuating device to the respective operations or states of the combustion chambers in a particularly advantageous manner, such that the valve train can be operated with a particularly low load.

By way of example, it is provided that the aforementioned valve device, which is designed in particular as an electric switching valve, is used, wherein the conducting elements can be supplied with the hydraulic fluid via the valve device, for example. In this case, for example, the first conducting element is arranged between the second conducting element and the valve device, such that the hydraulic fluid provided by the source can be supplied to the first conducting element or the conducting elements as a whole via the valve device. By way of example, by activating the valve device, the valve device releases the supply of the hydraulic fluid to the conducting elements, such that then, for example, the hydraulic fluid provided by the source can first flow into the first conducting element. If the rocker arm then releases the fluidic connection between the conducting elements, for example, the hydraulic fluid initially received in the first conducting element can then flow from the first conducting element into the second conducting element and then to the actuating device.

Here, it is preferably provided that the valve device is actuated in such a way that the hydraulic pressure provided by the hydraulic fluid and for example, in the form of oil pressure, takes place or occurs or is released at one of, for example, three possible crank angle instants for three cylinders, such that at the instant at which, on the basis of a hydraulic scheme, the supply, in particular filling, of one of the three hydraulic units per cylinder takes place, the hydraulic pressure is also present, and thus a period of time, during which, for example, a rocker arm of a second cylinder releases the fluidic connection between the conducting elements, and thus, for example, an actuating device of the first cylinder can be supplied with the hydraulic fluid provided by the source, is sufficient in order to completely or sufficiently fill or supply the actuating device to be supplied with the hydraulic fluid with hydraulic fluid, in particular in such a way that the aforementioned hydraulic actuating piston of the actuating device is sufficiently or completely moved, in particular extended.

In order to implement a particularly advantageous and effective engine braking operation, it is provided in a further embodiment of the invention that the valve train has at least one second rocker arm which is assigned to the second combustion chamber of the internal combustion engine and via which at least one second gas exchange valve assigned to the second combustion chamber can be actuated. By way of example, the second gas exchange valve is an exhaust valve.

The valve train further comprises a second actuating device assigned to a third combustion chamber of the internal combustion engine, for example in the form of a cylinder, by means of which the third combustion chamber can be switched between a firing mode for the fired operation and a braking mode for the engine braking operation of the internal combustion engine by supplying the second actuating device with hydraulic fluid. Here, the supply of hydraulic fluid to the second actuating device assigned to the third combustion chamber can be adjusted by means of the second rocker arm assigned to the second combustion chamber. The previous and following statements regarding the first gas exchange valve and the first actuating device with respect to the respective associated combustion chamber can also readily be applied to the second gas exchange valve and the second actuating device with respect to the respective associated combustion chamber, and vice versa.

In this embodiment, a crank-angle-synchronous supply of hydraulic fluid to the respective actuating device can be implemented, such that a crank-angle-synchronous control or activation of the engine braking system can be implemented. In contrast to the above-described, at least substantially simultaneous filling or supply of hydraulic fluid to the actuating devices designed as hydraulic units, the valve train according to the invention allows the respective actuating device to be supplied with hydraulic fluid individually, in particular individually for each combustion chamber or cylinder, which means that excessive loads can be avoided.

In particular, it is preferably provided that, in relation to the two actuating devices, i.e., in relation to the first actuating device and the second actuating device, always exactly one, or at most one, of the actuating devices is supplied with hydraulic fluid, while the other actuating device is not supplied with hydraulic fluid.

A further embodiment is characterised by at least one third rocker arm assigned to the third combustion chamber of the internal combustion engine, by means of which at least one third gas exchange valve assigned to the third combustion chamber can be actuated. In addition, a third actuating device assigned to the first combustion chamber of the internal combustion engine is provided, by means of which the first combustion chamber can be switched between a firing mode for fired operation and a braking mode for engine braking operation of the internal combustion engine by supplying the third actuating device with hydraulic fluid. Here, the supply of the hydraulic fluid to the third actuating device assigned to the first combustion chamber can be adjusted by means of the third rocker arm assigned to the third combustion chamber. The previous and following statements relating to the first or second actuating devices and to the first or second rocker arms with respect to the respective associated combustion chamber can also be readily applied to the third actuating device and the third rocker arm with respect to the associated combustion chamber, and vice versa, such that a particularly advantageous, in particular combustion chamber- or cylinder-specific supply of hydraulic fluid to the actuating devices is possible. In particular, it is preferably provided that exactly one, or at most one, of the three actuating devices is always supplied with hydraulic fluid, while, for example, the other two actuating devices are not supplied with hydraulic fluid.

In an alternative embodiment, a valve train of the type specified in the preamble of claim 10 is developed in accordance with the invention in such a way that the supply of hydraulic fluid to the actuating device assigned to the first combustion chamber can be adjusted by means of the rocker arm assigned to the second combustion chamber. In other words, the rocker arm, which is not assigned to the first combustion chamber but rather to the second combustion chamber, is used as a control or valve element for adjusting, i.e., influencing, the supply of hydraulic fluid to the actuating device, which is not assigned to the second combustion chamber but rather to the first combustion chamber.

In order to develop a method of the type specified herein in such a way that a particularly advantageous, in particular low-load, operation of the valve train can be represented, it is provided in accordance with the invention that the supply of hydraulic fluid to the actuating device assigned to the second combustion chamber is adjusted by means of the rocker arm assigned to the first combustion chamber. Advantages and advantageous embodiments of the valve train according to the invention are to be regarded as advantages and advantageous embodiments of the method according to the invention, and vice versa.

Further advantages, features and details of the invention arise from the following description of a preferred exemplary embodiment and from the drawings. The features and combinations of features mentioned above in the description, as well as the features and combinations of features mentioned below in the description of figures and/or shown in the figures alone, can be used not only in the combination indicated in each case, but also in other combinations or on their own, without leaving the scope of the invention.

BRIEF DESCRIPTION OF THE DRAWINGS

FIG. 2 is a diagram illustrating the valve train and a method for operating the valve train according to the invention; and FIG. 3 is a further diagram illustrating the valve train and the method.

DETAILED DESCRIPTION OF THE DRAWINGS

Figure 1:
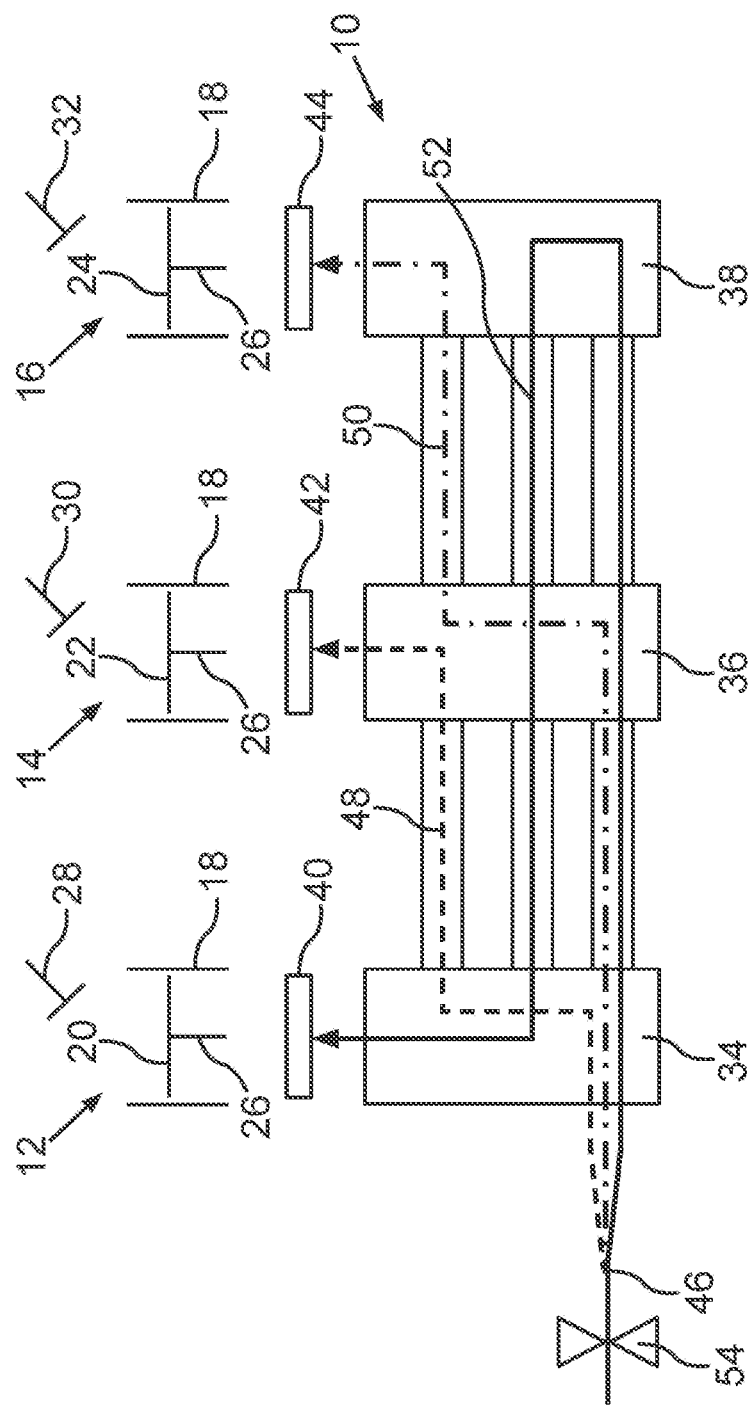
FIG. 1 is a schematic depiction of a valve train according to the invention.

In the figures, identical or functionally identical elements are provided with identical reference numerals.

FIG. 1 shows, in a schematic depiction, a valve train, referred to in its entirety as 10, for an internal combustion engine of a motor vehicle, in particular a motor vehicle, which can be seen in sections in FIG. 1. By way of example, the motor vehicle is designed as a commercial vehicle, in particular as a commercial motor vehicle. Here, the internal combustion engine is designed as a reciprocating piston engine, in particular as a reciprocating piston internal combustion engine, and comprises a first combustion chamber in the form of a first cylinder 12, a second combustion chamber in the form of a second cylinder 14, and a third combustion chamber in the form of a third cylinder 16. It can be seen from FIG. 1 that the respective cylinders 12, 14, 16 are in each case at least partially delimited by respective cylinder walls 18. Furthermore, a piston 20, 22 or 24 is accommodated in the respective cylinder 12, 14 or 16 so as to be translationally moveable. The respective piston 20, 22 or 24 can move back and forth translationally between a bottom dead center (BDC) and a top dead center (TDC).

The cylinders 12, 14 and 16 are formed, for example, by a cylinder housing of the internal combustion engine. The internal combustion engine also has an output shaft which is designed, for example, as a crankshaft and is rotatably mounted on a housing element of the internal combustion engine and can thus be rotated around an axis of rotation relative to the housing element. The housing element is designed as a crankcase, for example, wherein the housing element can be formed in one piece with the cylinder housing. Alternatively, it is conceivable that the cylinder housing and the housing element are formed as separately formed and interconnected components. Here, the respective pistons 20, 22 and 24 are connected to the crankshaft in an articulated manner via respective connecting rods 26, such that the translational movements of the pistons 20, 22 and 24 can be converted into a rotational movement of the crankshaft around its axis of rotation.

As will be explained in more detail below, the valve train 10 can be used to implement an engine braking operation of the internal combustion engine and thus an engine brake, such that the internal combustion engine can act as an engine brake for braking the motor vehicle. The engine brake is also referred to as an engine braking system, wherein the engine brake or engine braking system is designed as a hydraulic engine brake or hydraulic engine braking system. The internal combustion engine can thus be switched between engine braking operation and fired operation. During the fired operation, respective combustion processes start in the cylinders 12, 14 and 16, in the course of which respective fuel-air mixtures are ignited and combusted in the cylinders 12, 14 and 16. By way of example, the internal combustion engine is designed as a diesel engine, such that the respective fuel-air mixture is ignited by self-ignition and subsequently combusted.

By way of example, the internal combustion engine is designed as a four-stroke engine, such that a working cycle of the internal combustion engine comprises exactly two complete revolutions of the crankshaft and thus 720 degrees crank angle (° KW). Within such a working cycle, the respective piston 20, 22 or 24 moves exactly twice to the bottom dead center and twice to the top dead center, wherein exactly one combustion process takes place in the respective cylinders 12, 14 or 16 within such a working cycle. Thus, exactly one ignition or exactly one ignition process takes place in the respective cylinder 12, 14 or 16 within a working cycle of the internal combustion engine, wherein the respective fuel-air mixture is combusted as part of the respective ignition process. An ignition sequence is provided in which the ignition processes in the cylinders 12, 14 and 16 are carried out in a specific sequence during fired operation. The cylinders 12, 14 and 16 have a specific ignition sequence, which is also referred to as the ignition order.

The combustion of the respective fuel-air mixture produces an exhaust gas in fired operation, which comprises combustion products resulting from the combustion of the respective fuel-air mixture. The exhaust gas is pushed out of the respective cylinder 12, 14 or 16 by means of the respective piston 20, 22 or 24, in particular during fired operation.

For this purpose, at least one outlet channel not visible in FIG. 1 is assigned to the respective cylinder 12, 14 or 16, via which the exhaust gas can be discharged from the respective cylinder 12, 14 or 16. A respective gas exchange valve designed as an exhaust valve 28, 30 or 32 is assigned to the respective outlet channel. It can be seen from FIG. 1 that the exhaust valve 28 is assigned to the cylinder 12, the exhaust valve 30 to the cylinder 14, and the exhaust valve 32 to the cylinder 16. The respective exhaust valve 28, 30 or 32 can be moved between respective closed position and at least one respective open position, in particular translationally. In the closed position, the respective exhaust valve 28, 30 or 32 blocks the respective associated outlet channel. In the open position, however, the respective exhaust valve 28, 30 or 32 releases the respectively associated outlet channel, such that the exhaust gas can then flow from the respective cylinder 12, 14 or 16 into the respective outlet channel. The outlet channels and the associated exhaust valves 28, 30 and 32 are accommodated in a cylinder head not shown. As is known, the cylinder head has corresponding inlet channels and inlet valves analogous to the outlet channels and the exhaust valves 28, 30 and 32.

By way of example, the cylinders 12, 14 and 16 are assigned to a common first cylinder bank of the internal combustion engine or are formed by the first cylinder bank. The internal combustion engine can, for example, have a second cylinder bank which is provided in addition to the first cylinder bank and by means of which at least three further combustion chambers of the internal combustion engine, not shown in FIG. 1 and designed as cylinders, are formed. Thus, the internal combustion engine is designed, for example, as a six-cylinder engine. With reference to the previously mentioned ignition sequence or in the ignition sequence, the third cylinder 16 follows the first cylinder 12, for example, wherein the second cylinder 14 follows the third cylinder 16. Thus, for example, if the first cylinder 12 is designated 1, the second cylinder 14 is designated 2, and the third cylinder 16 is designated 3, the ignition sequence with respect to the cylinders 12, 14 and 16 of the first cylinder bank is as follows: 1-3-2. After a complete first pass of the ignition sequence, the third cylinder 16 (3) then follows the first cylinder 12 (1) for a second pass of the ignition sequence, and the second cylinder 14 (2) follows the third cylinder 16 (3).

Furthermore, the valve train 10 comprises a first rocker arm 34 assigned to the first cylinder 12 and thus to the first exhaust valve 28, via which the first exhaust valve 28 assigned to the first cylinder 12 can be actuated, i.e., moved from the closed position into the open position. In addition, the valve train 10 comprises a second rocker arm 36 assigned to the second cylinder 14 and thus to the second exhaust valve 30, via which the second exhaust valve 30 assigned to the second cylinder 14 can be actuated, i.e., moved from the closed position into the open position. Furthermore, the valve train 10 has a third rocker arm 38 assigned to the third cylinder 16 and thus to the third exhaust valve 32, via which the third exhaust valve 32 assigned to the third cylinder 16 can be actuated, i.e., moved from the closed position into the open position.

The respective rocker arm 34, 36 or 38 is assigned, for example, a respective cam, not depicted in FIG. 1, for fired operation, by means of which the respective rocker arm 34, 36 or 38 can be actuated and thereby pivoted, such that the respective exhaust valve 28, 30 or 32 can be actuated via the respectively associated rocker arm 34, 36 or 38 by means of the respectively associated cam. The respective cam is arranged, for example, on a camshaft and is connected in a rotationally fixed manner to the camshaft, which can be driven by the output shaft, in particular via a drive system. In this case, the respective cam has, for example, a respective base circle region having a respective base circle of the cam and at least one elevation region, in particular adjoining the base circle region, for actuating the respective rocker arm 34, 36 or 38. In the respective base circle region, for example, actuation of the respective rocker arm 34, 36 or 38 brought about by the respective cam is omitted, such that actuation of the respective exhaust valve 28, 30 or 32 brought about by the respective cam or by the respective rocker arm 34, 36 or 38 is omitted in the base circle region of the respective cam.

In the respective elevation region, however, the respective rocker arm 34, 36 or 38 and thus the respective associated exhaust valve 28, 30 or 32 are actuated. Within the scope of its respective actuation, i.e., within the scope of its movement from the closed position into or towards the open position, the respective exhaust valve 28, 30 or 32 performs a lift, which is also referred to as the valve lift or exhaust lift.

In addition, a respective actuating device 40, 42 or 44, depicted particularly schematically in FIG. 1, is assigned to the respective cylinder 12, 14 or 16. FIG. 1 shows that the actuating device 40 is assigned to the cylinder 12, the actuating device 42 to the cylinder 14, and the actuating device 44 to the cylinder 16. By means of the respective actuating device 40, 42 or 44, the respectively assigned cylinder 12, 14 or 16 can be switched between a firing mode for the fired operation and a braking mode for the engine braking operation of the internal combustion engine by supplying the respective actuating device 40, 42 or 44 with a hydraulic fluid. If, for example, the cylinders 12, 14 and 16 are each operated in the braking mode in which the respective braking mode is activated or set by the respective actuating device 40, 42 and 44, the internal combustion engine is operated in the engine braking mode. As a result, an engine brake is set or the internal combustion engine acts as an engine brake. During the engine braking operation, combustion processes taking place in the cylinders 12, 14 and 16, for example, are omitted, such that no combustion processes take place in the cylinders 12, 14 and 16 during the engine braking operation or the respective braking operation.

During braking operation, switching from the cams for fired operation to the cams for braking operation occurs by means of the actuating devices 40, 42 and 44. Here, the exhaust valves 28, 30 and 32 are no longer actuated by the cams for fired operation via the respective exhaust rocker arms 34, 36 and 38, but rather by cams for the braking operation. Here, the exhaust rocker arms 34, 36 and 38 perform a pivoting movement, wherein the exhaust valves 28, 30 and 32, however, each perform only one valve lift in accordance with the cams for braking operation. The valve lift in the braking operation can be transmitted, for example, via a brake rocker arm assigned to each cylinder 12, 14 and 16. A detailed description of such devices is dispensed with, since they are sufficiently known from the prior art.

To operate the internal combustion engine in the fired mode, the respective firing mode of the respective cylinder 12, 14 or 16 is set by means of the respective actuating device 40, 42 or 44, wherein combustion processes take place in the cylinders 12, 14 or 16 during the firing mode, as described above.

Since the respective actuating device 40, 42 or 44 is supplied with the the hydraulic fluid in order to switch between the firing mode and the braking mode of the respective cylinder 12, 14 or 16, in particular to switch from the firing mode to the braking mode, the respective actuating device 40, 42 or 44 is designed as a hydraulic actuating device 40, 42 or 44, i.e., as an actuating device 40, 42 or 44 which can be hydraulically actuated or operated, wherein the respective actuating device 40, 42 or 44 is also referred to as a hydraulic unit. The hydraulic fluid is, for example, oil, which is provided, for example, by a source, in particular a pump for conveying the hydraulic fluid. In particular, by means of the source, a pressure, i.e., a hydraulic pressure, of the hydraulic fluid can be brought about or adjusted, such that the hydraulic fluid has a pressure, i.e., a hydraulic pressure. By means of this hydraulic pressure, the respective actuating device 40, 42 or 44 can be actuated, such that with the aid of the hydraulic pressure it is possible, for example, to switch between the respective firing mode and the respective braking mode.

In particular, it is provided in the internal combustion engine that the three cylinders 12, 14 and 16 of the first cylinder bank and the further three cylinders of the second cylinder bank can be offset separately from one another in the respective braking mode. Thus, for example, the previous and following statements regarding the cylinders 12, 14 and 16 can readily be transferred to the other, further cylinders and vice versa.

Now, in order to be able to implement a particularly advantageous and, in particular, low-load operation of the valve train 10, it is provided in the valve train 10 that the supply to the actuating device 42 assigned to the second cylinder 14 can be adjusted by means of the rocker arm 34 assigned to the first cylinder 12. Furthermore, the supply of hydraulic fluid to the actuating device 44 assigned to the third cylinder 16 is adjustable by means of the second rocker arm 36 assigned to the second cylinder 14. In addition, the supply of hydraulic fluid to the actuating device 40 assigned to the first cylinder 12 is adjustable by means of the third rocker arm 38 assigned to the third cylinder 16.

The rocker arms 34, 36 and 38 are, for example, arranged in a pivotable manner on a rocker arm axis and can thus be pivoted relative to the rocker arm axis, in particular as a result of actuation of the respective rocker arm 34, 36 and 38 by the respective cam. At least four conducting elements 46, 48, 50 and 52 run in the rocker arm axis, for example, through which the hydraulic fluid can flow—as illustrated by arrows in FIG. 1. Here, the arrows shown in FIG. 1 illustrate a respective flow direction in which the hydraulic fluid can flow, in particular from the source, through the conducting elements 46, 48, 50 and 52, in particular to the respective actuating devices 40, 42 and 44.

If the respective actuating device 40, 42 or 44 is no longer supplied with the hydraulic fluid, there is a switch back from the braking mode to the firing mode. In this case, no hydraulic fluid flows from the source through the conducting elements 46, 48, 50 and 52 to the respective actuating devices 40, 42 and 44, and the arrows of the flow direction shown in FIG. 1 are reversed. In this case, the hydraulic fluid does not flow back to the source but rather exits from the actuating devices 40, 42 and 44 and transitions between the conducting elements 46, 48, 50 and 52. Advantageously, the switch from the braking mode to the fired mode is performed in succession, as is the switch from the fired mode to the braking mode, such that the actuating devices 40, 42 and 44 are not switched off simultaneously or no longer supplied with hydraulic fluid simultaneously, whereby undesirable conditions, such as incompletely retracted actuating devices 40, 42 and 44, can be avoided.

Here, the valve train 10 further comprises a valve device 54, which is designed, for example, as a switch valve, in particular as an electric switch valve. With reference to the aforementioned direction of flow, the conducting element 46 is arranged upstream of the conducting elements 48, 50 and 52, wherein the conducting elements 48, 50 and 52 can be supplied with the hydraulic fluid provided by the source via the conducting element 46. Thereby, for example, with respect to the direction of flow of the hydraulic fluid flowing from the source to the actuating devices 40, 42 and 44, the valve device 54 is arranged between the conducting element 46 and the source, such that the conducting element 46 can be supplied with the hydraulic fluid via the valve device 54. In particular, the valve device 54 is adjustable, in particular electrically, between at least one closed position and at least one open position. In the closed position, the conducting element 46 is fluidically separated from the source by means of the valve device 54, such that no hydraulic fluid can flow from the source into the conducting element 46. In the open position, however, the valve device 54 releases the conducting element 46, such that the hydraulic fluid provided by the source can then flow from the source into the conducting element 46. Thus, for example, a sufficient hydraulic pressure of the hydraulic fluid is first set by means of the source, in particular by means of the pump, in particular while the valve device 54 is still in the closed position. If the valve device 54 is then opened, the hydraulic fluid having the pressure can flow into the conducting element 46 and flow through the conducting element 46.

The rocker arm 34 is thereby pivotable relative to the rocker arm axis between a plurality of first pivot positions interrupting a fluidic connection between the conducting elements 46 and 48, and a plurality of second pivot positions releasing the fluidic connection between the conducting elements 46 and 48. If the rocker arm 34 releases the fluidic connection between the conducting elements 46 and 48, the hydraulic fluid having the hydraulic pressure can flow from the conducting element 46 into the conducting element 48 and flow through the conducting element 48, such that the hydraulic fluid is guided to the actuating device 42 by means of the conducting element 48. The actuating device 42 is thus supplied with the hydraulic fluid, in particular filled, via the conducting elements 48 and 46 and via the valve device 54. The same can be applied to the actuating device 44, the rocker arm 36 and the conducting elements 46 and 50, and to the actuating device 40, the rocker arm 38 and the conducting elements 46 and 52. Thus, for example, the rocker arm 36 is also pivotable relative to the rocker arm axis between a plurality of first pivot positions interrupting a fluidic connection between the conducting elements 46 and 50 and a plurality of second pivot positions releasing the fluidic connection between the conducting elements 46 and 50. Thus, if the rocker arm 36 releases the fluidic connection between the conducting elements 46 and 50, the hydraulic fluid can flow from the conducting element 46 into the conducting element 50, whereby the actuating device 44 can be supplied, in particular filled, with the hydraulic fluid.

Accordingly, for example, the rocker arm 38 is pivotable relative to the rocker arm axis between a plurality of first pivot positions interrupting a fluidic connection between the conducting elements 46 and 52 and a plurality of second pivot positions releasing the fluidic connection between the conducting elements 46 and 52. If the rocker arm 38 thus releases the fluidic connection between the conducting elements 46 and 52, the hydraulic fluid can flow from the conducting element 46 into the conducting element 52 and from the latter to the actuating device 40, whereby the actuating device 40 is supplied with the hydraulic fluid, in particular filled. By supplying or filling the respective actuating device 40, 42 or 44 with the hydraulic fluid, a respective hydraulic actuating piston of the respective actuating device 40, 42 or 44 is extended, for example, in order to switch from the respective firing mode to the respective braking mode. By supplying the actuating devices 40, 42 and 44 with the hydraulic fluid as described, a crank-angle-synchronous actuation of the engine braking system can be implemented, wherein undesirable and unfavorable situations which could lead to excessive loads on the valve train 10 can be avoided.

The valve train 10, in particular its function, and a method for operating the valve train 10 are illustrated below with reference to FIGS. 2 and 3. FIG. 2 shows a diagram, on the abscissa 56 of which degrees of crank angle and thus rotational positions of the crankshaft are plotted. The valve lift in millimetres is plotted on the ordinate 58. A dashed course 60 plotted on the diagram shown in FIG. 2 illustrates the valve lift of the respective exhaust valve 28, 30 or 32 during fired operation, i.e., during the respective firing mode. A solid course 62 plotted on the diagram shown in FIG. 2 illustrates the respective valve lift of the respective exhaust valve 28, 30 or 32 during engine braking operation, i.e., during the respective braking operation. In order to switch from the fired operation to the engine braking operating, i.e., from the firing mode to the braking mode, a valve lift of the respective exhaust valve 28, 30 or 32 illustrated by the course 60 in the fired operation is switched off, and a valve lift of the respective exhaust valve 28, 30 or 32 illustrated by the course 62 is switched on. As can be seen from FIG. 2, the crank angle range between approximately 45 degrees crank angle and approximately 300 degrees crank angle is suitable for this purpose, since in this crank angle range, both courses 60 and 62, also referred to as elevation curves, are in a valve lift of zero or zero millimetres. Switching, for example, from the respective firing mode to the respective braking mode is thus possible without having to move the respective exhaust valve 28, 30, or 32 and without undesirably high valve contact speeds occurring. In this case, for example, the gas exchange (TDC) is at zero degrees crank angle.

To switch off the valve lift illustrated by the course 60 and to switch on the valve lift illustrated by the course 62, the hydraulic fluid in the form of pressure oil, for example, or its pressure is used. It has been found that the hydraulic fluid can be supplied to the respective actuating device 40, 42 or 44 at the correct time for the switching described if the respective movement of the respective rocker arm 34, 36 or 38, which functions as an exhaust rocker arm, of the respective downstream cylinder 16, 14 or 12 of the same cylinder bank in the ignition sequence is used to supply the pressure. This can be seen from a course 64. Thus, for example, the course 60 illustrates the valve lift of the exhaust valve 28, wherein the course 64 illustrates the valve lift of the exhaust valve 32 of the cylinder 16 following the cylinder 12 in the ignition sequence. The rocker arm 38 is thus used to supply the hydraulic fluid to the actuating device 40, since the cylinder 16, which the rocker arm 38 is assigned to, follows the cylinder 12, which the actuating device 40 is assigned to, in the ignition sequence. Furthermore, to supply the hydraulic fluid to the actuating device 44, the rocker arm 36 is used, since the cylinder 14, which the rocker arm 36 is assigned to, follows the cylinder 16, which the actuating device 44 is assigned to, in the ignition sequence. Furthermore, the rocker arm 34 is used to supply the hydraulic fluid to the actuating device 42, since the cylinder 12, which the rocker arm 34 is assigned to, follows the cylinder 14, which the actuating device 42 is assigned to, in the ignition sequence.

An alternative supply of the hydraulic fluid to the respective actuating devices 40, 42 and 44 in the present ignition sequence 12, 16 and 14, respectively, is also conceivable, wherein cylinders 14, 12 and 16 of the same cylinder bank preceding in the ignition sequence are used in braking operation to control the respective actuating devices 40, 42 and 44, respectively. Thus, the rocker arm 36 is used to supply hydraulic fluid to the actuating device 40, since the cylinder 14, to which the rocker arm 36 is assigned, precedes the cylinder 12, to which the actuating device 40 is assigned, in the ignition sequence. Furthermore, the rocker arm 34 is used to supply hydraulic fluid to the actuating device 44, since the cylinder 12, to which the rocker arm 34 is assigned, precedes the cylinder 16, to which the actuating device 44 is assigned, in the ignition sequence. Furthermore, the rocker arm 38 is used to supply hydraulic fluid to the actuating device 42, since the cylinder 16, to which the rocker arm 38 is assigned, precedes the cylinder 14, to which the actuating device 42 is assigned, in the ignition sequence. A selection of a rocker arm to be controlled in the ignition sequence in braking operation with a rocker arm following or preceding in the ignition sequence depends on the provided elevation range or on the design of the elevation ranges of the cam for the braking operation.

As long as a pivoting movement of the respective rocker arm 34, 36 or 38 causes a corresponding valve lift of the respective exhaust valve 28, 30 or 32 that is below a predeterminable limit value, wherein the limit value of the corresponding valve life is four millimetres, for example, the supply of hydraulic fluid to the respective actuating device 40, 42 or 44 by means of the respective rocker arm 34, 36 or 38 remains blocked. As soon as the respective rocker arm 34, 36 or 38 is moved or pivoted in such a way that the corresponding valve lift of the respective exhaust valve 28, 30 or 32 exceeds the predeterminable limit value of, for example, four millimetres, a cross section through which the hydraulic fluid can flow and thus the aforementioned fluidic connection are released from the respective rocker arm 34, 36 or 38, for example, as illustrated in FIG. 2 by a course 66.

FIG. 3 shows a diagram on the abscissa 68 of which degrees of crank angle are plotted, wherein the valve lift in millimetres or the respective corresponding pivot movements of the rocker arms 34, 36 and 38 are plotted on the ordinate 70 of the diagram shown in FIG. 3. By way of example, a course 72 entered in the diagram shown in FIG. 3 illustrates the movement of the rocker arm 34, wherein, for example, a course 74 entered in the diagram shown in FIG. 3 illustrates the movement of the rocker arm 38 and a course 76 illustrates the movement of the rocker arm 36. The sequence of movement of the rocker arms 34, 36 and 38 corresponds to the ignition sequence: 1-3-2. As can be seen from the diagram, the courses 72, 74 and 76 of a cylinder bank are offset from each other by 240 degrees of crank angle, which, as is known, corresponds to twice the ignition distance of an in-line six-cylinder internal combustion engine with the ignition sequence 1-5-3-6-2-4. As can be seen easily from FIG. 3, the courses 72, 74 and 76 do not overlap, such that at most exactly one of the actuating devices 40, 42 and 44 is supplied with hydraulic fluid for each course 72, 74 and 76. Thus, the hydraulic fluid is always supplied to the actuating device 40, 42 or 44 of the cylinder 12, 14 or 16, the actuating device 40, 42 or 44 of which is to be supplied with the hydraulic fluid next and thus activated, and the hydraulic fluid is not—as is usually the case—distributed simultaneously between all actuating devices 40, 42 and 44 of a cylinder bank. As can also be seen from FIG. 3, between intervals A, in which the respective actuating device 40, 42 or 44 is supplied with the hydraulic fluid and can thus be filled, there are intervals B, in which none of the actuating devices 40, 42 and 44 is supplied with the hydraulic fluid, since, for example, during intervals B there is no actuation of the respective rocker arm 34, 36 or 38 beyond the pivoting movement of the rocker arms 34, 36 or 38 corresponding to an exhaust valve lift in fired operation of 4 mm.

Preferably, the supply of the hydraulic fluid to the conducting element 46 via the valve device 54 is controlled or regulated in such a way that, at the end of the release of the fluidic connection between the conducting elements 46 and 48 or 46 and 50 or 46 and 52, no pressure oil or hydraulic fluid is present, but at the beginning of the release of the fluidic connection, the full hydraulic pressure is present. Thus, the valve device 54 is preferably actuated in such a way that this takes into account a switching-on delay time of the valve device 54 and delay time of the build-up of the hydraulic pressure in the conducting element 46 that can be supplied with the hydraulic fluid via the valve device 54, in particular depending on engine speed, oil pressure, oil viscosity and/or temperature and/or possibly other physical variables. The same also applies to the deactivation of the engine brake, i.e., to switching over from engine brake operation to fired operation.

In other words, if, for example, the respective rocker arm 34 or 36 or 38 performs a pivoting movement which exceeds a certain value for an exhaust valve lift in fired operation, the respective rocker arm 34, 36 or 38 releases the respective fluidic connection. The respective fluidic connection is released, for example, by a groove in a bearing bush, via which the respective rocker arm 34, 36 or 38 is mounted pivotably or rotatably on the rocker arm axis. Preferably, the groove is arranged in such a way that the groove always has a fluidic connection with the respective conducting element 48 or 50 or 52 arranged downstream of the conducting element 46, but a fluidic connection of the groove to the conducting element can be blocked and released by means of the respective rocker arm 34, 36 or 38. In particular, the connection of the groove to the conducting element 46 is interrupted or blocked by means of the respective rocker arm 34, 36 or 38, respectively, while the respective rocker arm 34, 36 or 38 extends in the base circle region and thus on the base circle of the cam. Then, when the respective cam causes a pivoting movement of the respective rocker arm 34, 36 or 38, and preferably when the pivoting movement exceeds an angle which, in fired operation, corresponds to an exhaust valve lift of a predeterminable value of, for example, four millimetres, the connection between the groove and the conducting element 46 is then fluidically connected via the respective groove to the respective conducting element 48, 50 or 52.

Preferably, the conducting elements 46, 48, 50 and 52, which are formed, for example, as oil channels, are designed in such a way that respective inflows and outflows of the respective conducting elements 48, 50 and 52 are oriented upwards, in particular in the vehicle vertical direction, such that they do not run dry under the influence of gravity. This is advantageous in particular because a total volume that is required to activate the actuating devices 40, 42 and 44 or to activate the hydraulic elements of the actuating devices 40, 42 and 44 varies in size. The largest total volume is, for example, that of the actuating device 42, which is supplied with the hydraulic fluid via the rocker arm 34. A further embodiment can provide that for each individual cylinder 12, 14 or 16 or for the respective individual actuating device 40, 42 or 44, a respective, individual derivative time is provided in order to compensate for the differences in the total volumes to be filled.

LIST OF REFERENCE CHARACTERS 10 valve train
12 cylinder
14 cylinder
16 cylinder
18 cylinder wall
20 piston
22 piston
24 piston
26 connecting rod
28 exhaust valve
30 exhaust valve
32 exhaust valve
34 rocker arm
36 rocker arm
38 rocker arm
40 actuating device
42 actuating device
44 actuating device
46 conducting element
48 conducting element
50 conducting element
52 conducting element
54 valve device
56 abscissa
58 ordinate
60 course
62 course
64 course
66 course
68 abscissa
70 ordinate
72 course
74 course
76 course
A course
B interval

The invention claimed is:
1. A valve train (10) of an internal combustion engine of a motor vehicle, the valve train comprising:
   a first rocker arm (34) assigned to a first combustion chamber (12) of the internal combustion engine, the first rocker arm (34) configured to actuate a first gas exchange valve (28) assigned to the first combustion chamber (12);
   a first actuating device (42) assigned to a second combustion chamber (14) of the internal combustion engine, the first actuating device (42) configured to selectively switch the second combustion chamber (14) between a firing mode and a braking mode via a hydraulic fluid;

wherein a supply of the hydraulic fluid to the first actuating device (42) is controlled based on a position of the first rocker arm (34);

wherein the first rocker arm (34) is pivotally disposed on a rocker arm axis, the rocker arm axis including a first conducting element (46) fluidly connected to a second conducting element (48) so as to guide the hydraulic fluid to the first actuating device (42);

wherein a fluidic connection between the first and second conducting elements (46, 48) is closed when the first rocker arm (34) is in a first pivot position, and the fluidic connection is opened when the first rocker arm (34) is in a second pivot position; and an electric valve device (54) configured to control a pressure of the hydraulic fluid in the first conducting element (46) such that the hydraulic fluid is fully depressurized at a time the first rocker arm (34) is switched to the first pivot position, and the hydraulic fluid is fully pressurized at a time the first rocker arm (34) is switched to the second pivot position.

2. The valve train (10) according to claim 1, wherein the first pivot position comprises a plurality of first pivot positions along a first pivot range of the first rocker arm (34), wherein the second pivot position comprises a plurality of second pivot positions along a second pivot range of the first rocker arm (34), and wherein the second pivot range is separate from the first pivot range.

3. The valve train (10) according to claim 2, wherein a cam is assigned to the first rocker arm (34), wherein the cam has a base circle region in which actuation of the first rocker arm (34) does not occur, and an elevation region which is raised with respect to the base circle region so as to actuate the first rocker arm (34), and wherein the first pivot range corresponds to the base circle region.

4. The valve train (10) according to claim 3, wherein the second pivot range corresponds to at least a part of the elevation region.

5. The valve train (10) according to claim 1, wherein the first combustion chamber (12) follows the second combustion chamber (14) in an ignition sequence.

6. The valve train (10) according to claim 1 further comprising:

a second rocker arm (36) assigned to the second combustion chamber (14), the second rocker arm (36) configured to actuate a second gas exchange valve (30) assigned to the second combustion chamber (14); and a second actuating device (44) assigned to a third combustion chamber (16) of the internal combustion engine, the second actuating device (44) configured to selectively switch the third combustion chamber (16) between a firing mode and a braking mode via the hydraulic fluid;

wherein a supply of the hydraulic fluid to the second actuating device (44) is controlled based on a position of the second rocker arm (36).

7. The valve train (10) according to claim 6 further comprising:

a third rocker arm (38) assigned to the third combustion chamber (16), the third rocker arm (38) configured to actuate a third gas exchange valve (32) assigned to the third combustion chamber (16); and a third actuating device (40) assigned to the first combustion chamber (12), the third actuating device (40) configured to selectively switch the first combustion chamber (12) between a firing mode and a braking mode via the hydraulic fluid;

wherein a supply of the hydraulic fluid to the third actuating device (40) is controlled based on a position of the third rocker arm (38).

* * * * *